A. Fessenden.

Tobbacco Pipe.

No. 2,085. Reissued Oct. 10, 1865.

Witnesses;
Albert N. Brown
Frederic A. Sayer

Inventor;
Abijah Fessenden

UNITED STATES PATENT OFFICE.

ABIJAH FESSENDEN, OF BOSTON, MASSACHUSETTS, ASSIGNOR TO ALFRED B. ELY.

TOBACCO-PIPE.

Specification forming part of Letters Patent No. 45,233, dated November 29, 1864; Reissue No. 2,085, dated October 10, 1865.

*To all whom it may concern:*

Be it known that I, ABIJAH FESSENDEN, of Boston, in the county of Suffolk and State of Massachusetts, have invented certain new and useful Improvements in Tobacco-Pipes.

The following description, in connection with the accompanying drawings, forms a full and exact specification.

The object of the invention is to provide a readily-cleansed receptacle for the nicotine, which is evolved in smoking within the bowl of the pipe, and to relieve the smoke of heat before it reaches the mouth.

The invention consists in dividing the bowl of the pipe into three or more chambers, communicating with each other and with the stem, and so constructed that the tobacco being placed and burned in one chamber, the smoke passing from that into another chamber leaves the nicotine there deposited, and thence purified and cooled passes through another or series of other chambers to the mouth. The chamber in which the nicotine is deposited is so constructed as to be easily removed and cleansed. The saliva or moisture from the mouth entering the tube does not reach the tobacco or the nicotine, but falls into the outer chamber or bowl, from whence it is easily emptied. The smoke is essentially cooled before it reaches the mouth. As generally constructed by me, the chambers have been made concentric, as considered the more economical way; but this is not necessary, as the form of the chambers and the placing of the partitions may be readily changed. The inner chamber for holding the tobacco has generally been lined with cement or some non-conducting substance; but this is not necessary.

Having thus described the invention generally, the following is a particular specification of the present method of constructing the new pipe, reference being had to the drawings.

Figure 1:
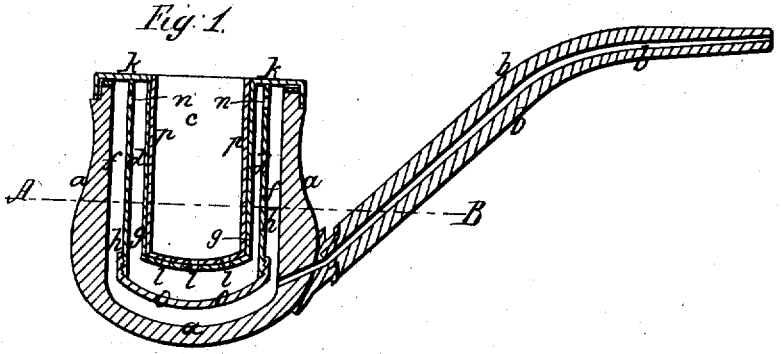
Figure 2:
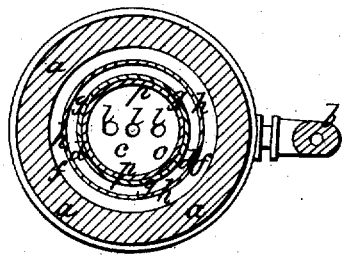

Figure 1 is a central longitudinal vertical section. Fig. 2 is a horizontal section in the plane of the line A B, Fig. 1.

*a a* in the drawings represent the bowl of the pipe; *b b*, the stem. The bowl is divided into three chambers, *c*, *d*, and *f*, by two partition-plates, *g* and *h*, attached at their upper ends to a common top plate, *k*, or otherwise, in such a manner as to be easily removed from the bowl, if desired. The tobacco is placed in the chamber *c*, which is open at the top. Communication with the other chambers and the mouth-piece is made through apertures *l l l* in the bottom plate, *m*, of chamber *c*, and apertures *n n* in the upper part of the partition-plate *h* of chamber *d*. The bottom plate, *o*, of chamber *d* forms a cap, which is attached to the partition-plate *h* by a screw-thread or otherwise, so as to be taken off and put on at pleasure when the chamber is removed from the bowl. This cap forms a receptacle in which the nicotine passing through the apertures *l l l* is deposited. Instead of having a cap, *o*, however, the chamber *d* may be made whole and fastened at its top to the plate *k* or the chamber *c*, so as to be easily removed and cleansed. Thus the smoke passing from chamber *c* through apertures *l l l* into chamber *d* leaves there the nicotine, and thence passing through apertures *n n* into chamber *f*, reaches the stem purified and cooled. The saliva passing from the mouth downward through the stem is collected in the bottom of the bowl or chamber *f*, from which it may be readily emptied.

More than three chambers may be used, but three will secure the desired results.

Having thus described the invention, what is claimed, and desired to be secured by Letters Patent, is—

Dividing the bowl of the tobacco-pipe into three or more chambers, substantially as and for the purposes described.

ABIJAH FESSENDEN.

Witnesses:
W. M. PARKER,
A. P. ROLLINS.